July 5, 1955

R. L. SMIRL 2,712,373

CLUTCH

Filed June 22, 1949

Inventor:
Richard L. Smirl
By: [signature]
Atty.

July 5, 1955  R. L. SMIRL  2,712,373
CLUTCH
Filed June 22, 1949  5 Sheets-Sheet 3

Inventor:
Richard L. Smirl

July 5, 1955  R. L. SMIRL  2,712,373
CLUTCH
Filed June 22, 1949  5 Sheets-Sheet 4
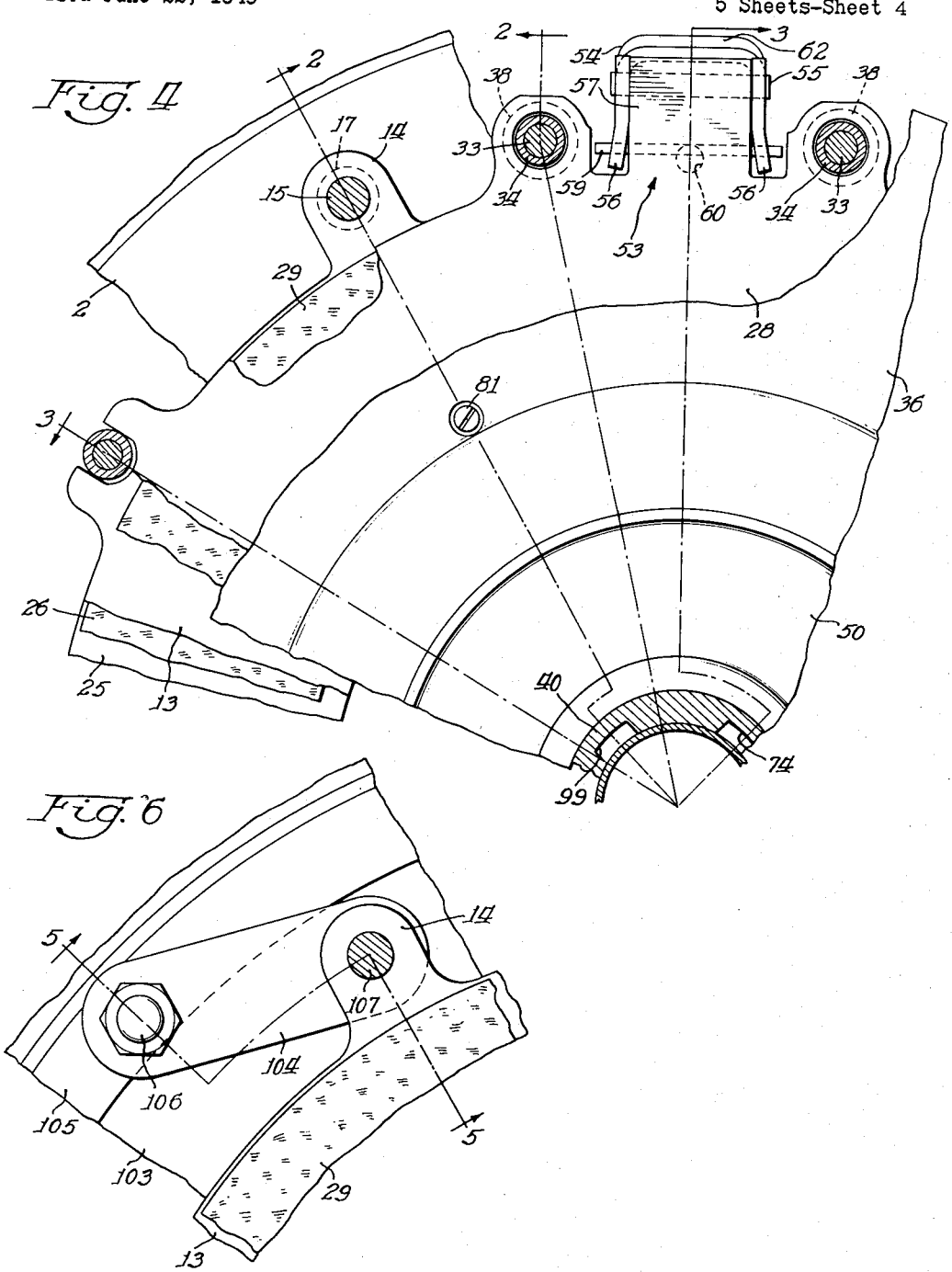
Inventor:
Richard L. Smirl
By: Edward
Atty.

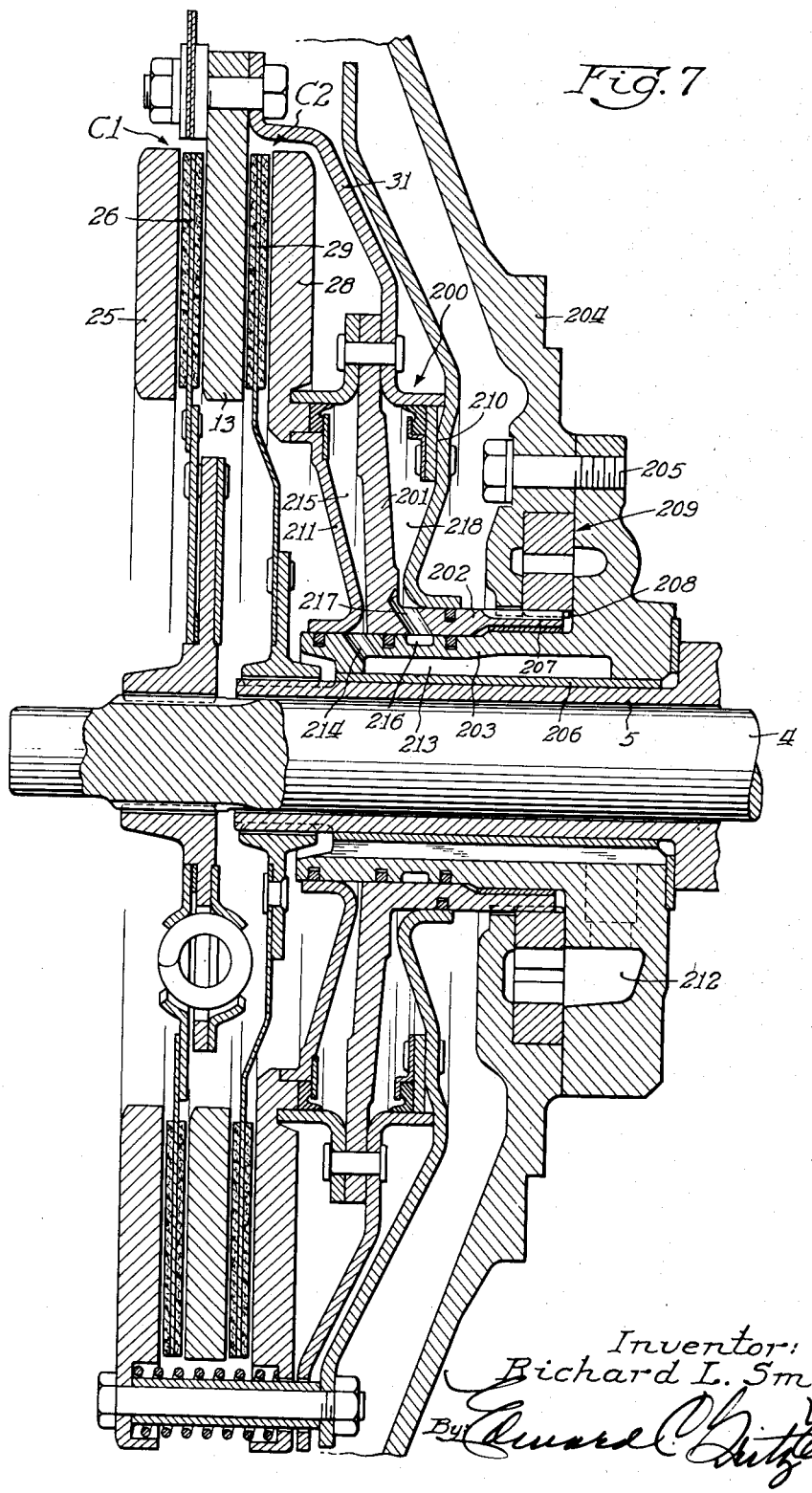

United States Patent Office 2,712,373
Patented July 5, 1955

2,712,373

CLUTCH

Richard L. Smirl, La Grange, Ill., assignor to Borg-Warner Corporation, Chicago, Ill., a corporation of Illinois Application June 22, 1949, Serial No. 100,670

5 Claims. (Cl. 192—103)

This invention relates to clutches and more particularly to friction clutches, and controls therefor, suitable for use in automotive transmissions, such as disclosed in my co-pending application for patent, Serial No. 84,851.

An object of the invention is to provide a clutch assembly of novel design and having improved control means therefor.

Another object of the invention is to provide a clutch assembly having improved pressure fluid-operated means for actuating the same.

Another object of the invention is to provide a clutch having rotatably associated therewith pressure fluid-operated means for effecting engagement of the clutch and spring means for effecting disengagement of the clutch, a feature of the invention residing in the employment of speed-responsive means acting in concert with the clutch-disengaging pressure of the spring means to exhaust fluid in the pressure fluid-operated means tending, under the influence of centrifugal force, to maintain the clutch engaged.

A further object of the invention is the provision of a double clutch assembly having improved pressure fluid-operated mechanism for alternately or successively actuating the clutches as required to couple one or more members of transmission gearing to an engine-driven shaft to effect changes in the speed ratios of the transmission.

Another object of the invention is to provide a double clutch assembly having a plurality of driving pressure plates engageable with driven plates and selectively actuable by fluid-operated means rotatable therewith.

Still another object of the invention is to provide a double clutch assembly having fluid-operated actuating means drivingly connected to an engine-driven shaft and to a pump for delivering fluid under pressure to the actuating means. In one modification, the actuating means includes a pressure-fluid distributor member rotatable therewith and driving the pump, and in another modification, the actuating means includes a supporting member connected to and driving the pump.

A further object of the invention is the provision of a double clutch assembly adapted to rotate in an oil bath, and including a novel cooling arrangement including a baffle for directing cooling oil to one of the clutches of the transmission.

The invention consists of the novel constructions, arrangements, and devices to be hereinafter described and claimed for carrying out the above-stated objects and such other objects as will appear from the following description of the embodiments illustrated in the accompanying drawings, wherein:

Fig. 4 is a rear view of a portion of the clutch assembly;

Fig. 6 is a rear view of the structure shown in Fig. 5, as indicated by the line 6—6 of Fig. 5;

Fig. 7 is a sectional view of a modification of the clutch assembly shown in Figs. 1–6.

Like characters of reference designate like parts of the several views.

Figure 1:
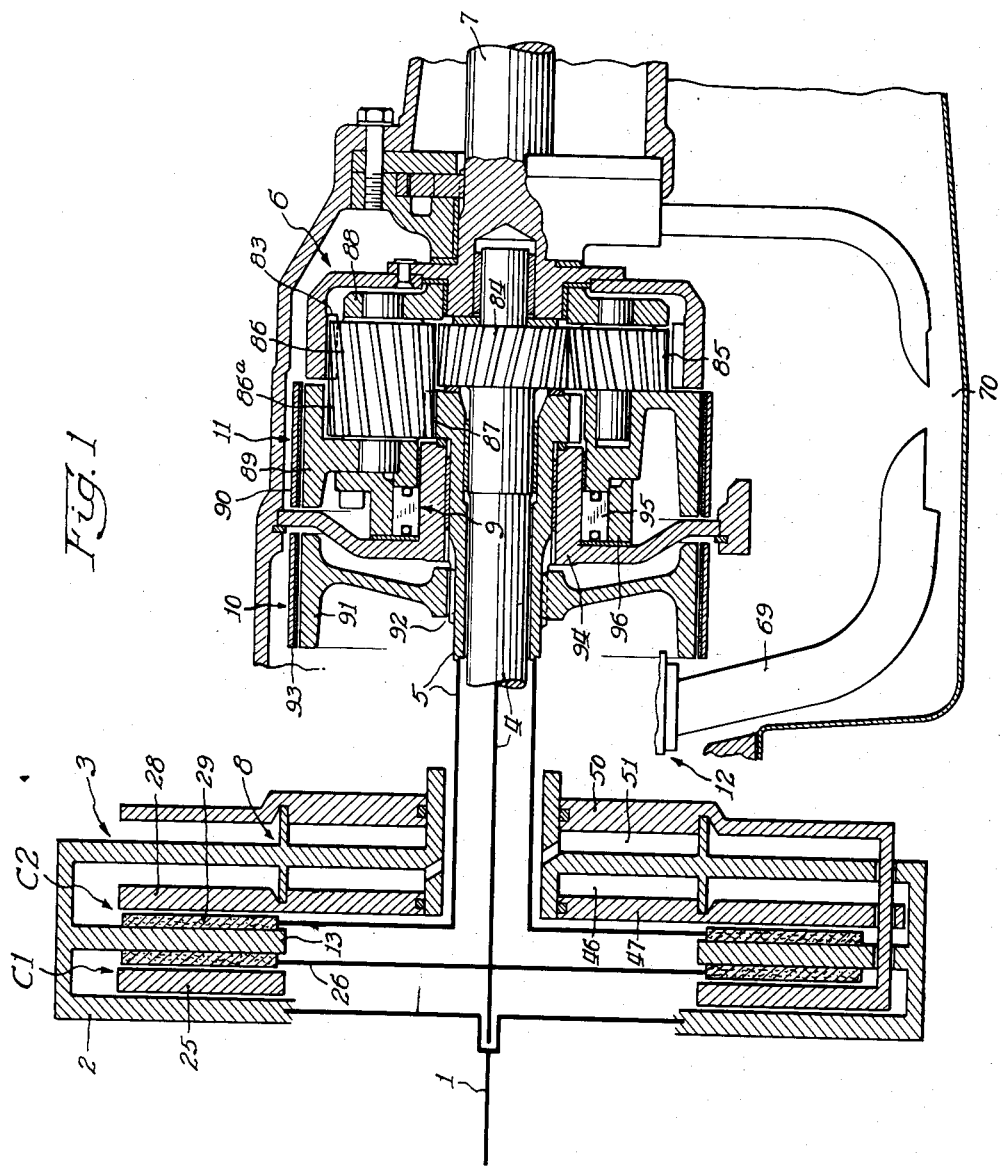
Fig. 1 is a sectional view of a transmission incorporating a double clutch assembly embodying the principles of the invention, said clutch being shown schematically.

Referring now to Fig. 1, the transmission illustrated and embodying my improved double clutch assembly and control mechanism therefor comprises a drive shaft 1, which may be the rear extremity of an engine crankshaft, and the shaft 1 is provided with a radial flange to which is bolted the flywheel 2. The flywheel 2 is adapted to support the driving members or plates of the double clutch assembly, indicated generally at 3, engageable with driven friction plates of the assembly, respectively keyed to a shaft 4 and a quill shaft 5, which are drivingly connected to members of a planetary gear set generally indicated at 6. The gear set 6 is connected to a driven shaft 7, which may transmit drive to the rear wheels of an automobile. Engagement of the driving plates and the driven plates of the double clutch assembly 3 is effected by means of a pressure-fluid actuated mechanism indicated generally at 8. The clutch-operating mechanism 8 is operative to alternately or successively effect engagement of the clutches C1 and C2 of the double clutch assembly to transmit torque from the driving shaft 1 to either or both the shafts 4 and 5 connected to the planetary gear set 6. Suitable controls are provided for the gear set 6 to effect operation thereof to provide different forward speed ratio drives or reverse drive. These controls comprise a free-wheeling or overrunning clutch device 9 to provide a low speed ratio, a friction type brake 10 for the second or intermediate speed ratio, and another friction type brake 11 for establishing reverse drive of the driven shaft 7; the controls 9, 10, and 11 controlling various reaction elements of the planetary gear set 6 in a manner hereinafter described.

Figure 2:
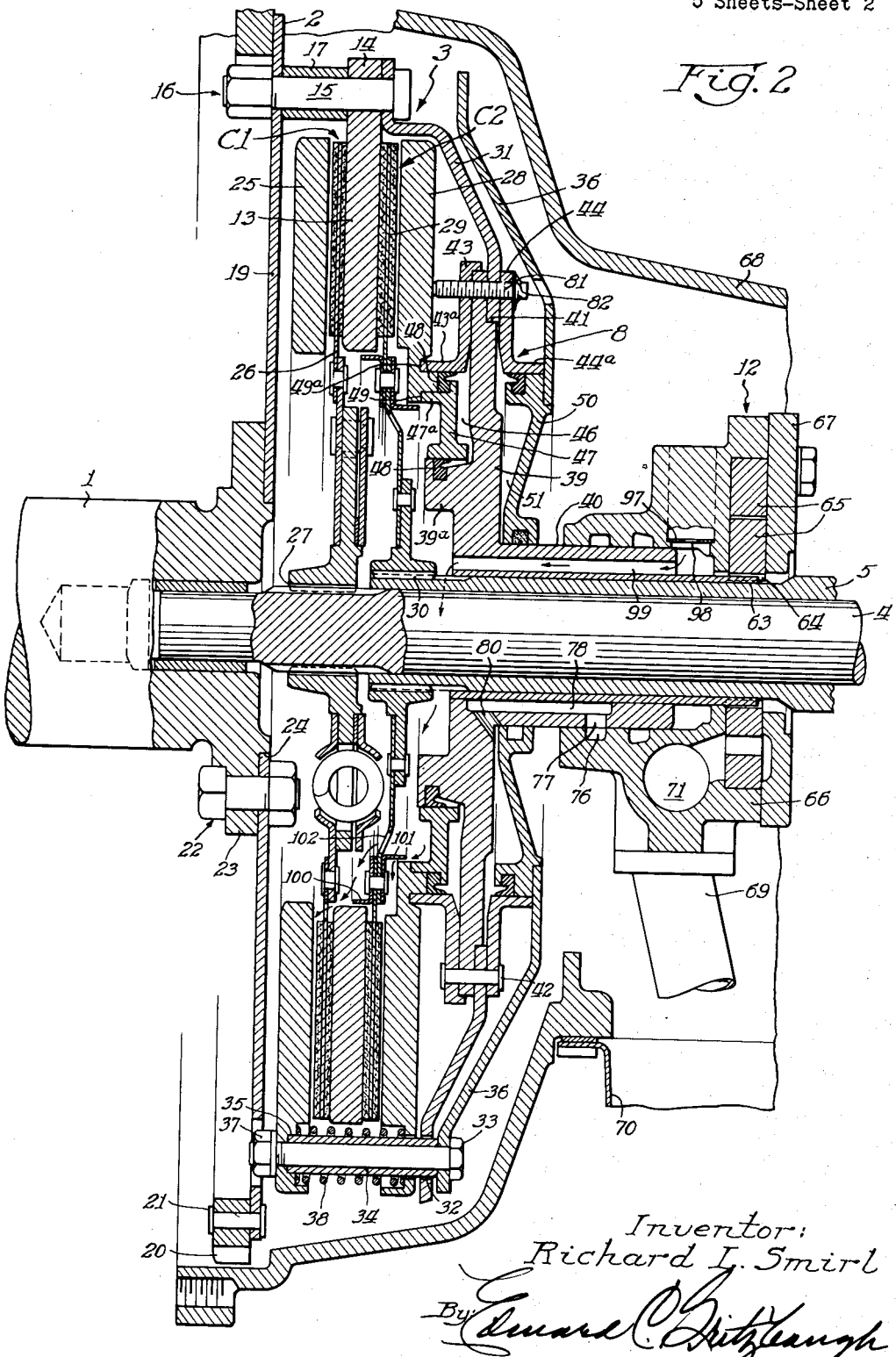
Fig. 2 is a view illustrating the structure of the clutch assembly shown in Fig. 1, the clutch structure being shown in section, said section being along line 2—2 of Fig. 4.
Figure 3:
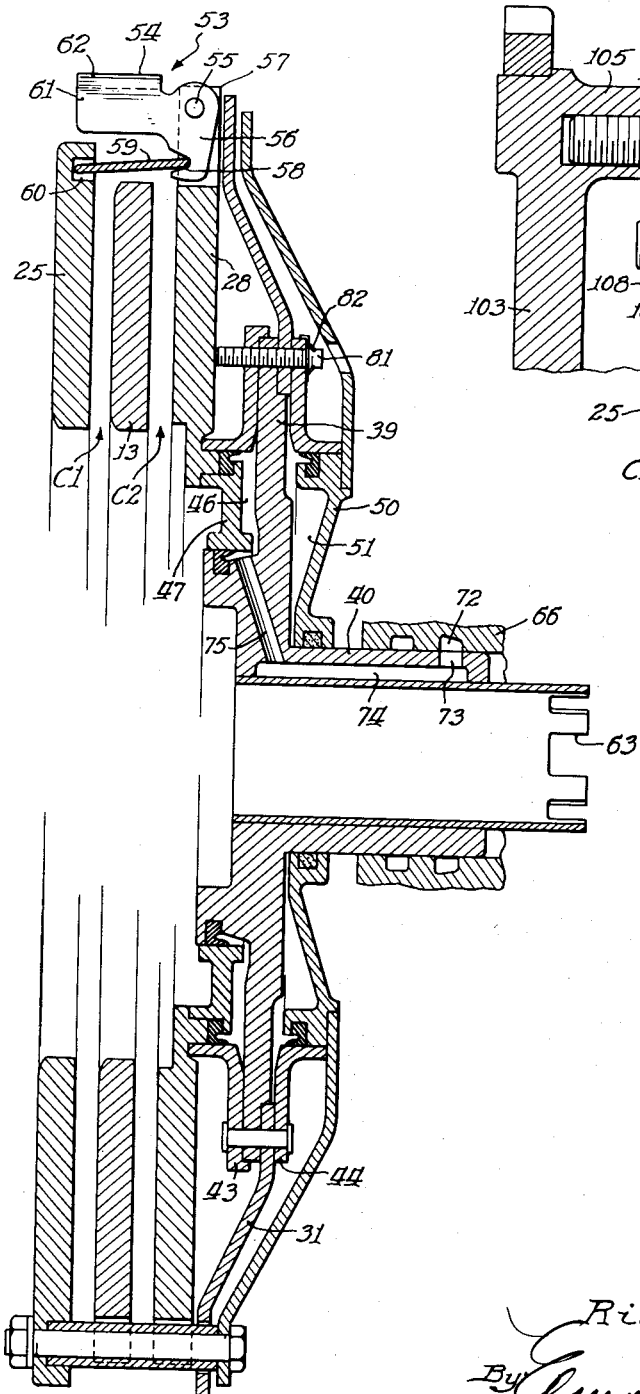
Fig. 3 is another sectional view of the clutch assembly shown in Figs. 1 and 2, said section being taken on the line 3—3 of Fig. 4.

Referring now to Figs. 1, 2 and 3, the illustrated double clutch assembly 3 comprises the clutch C1 and clutch C2, the clutch C1 being operable to provide and release a driving connection between the engine-driven shaft 1 and a shaft 4, and the clutch C2 being actuable to effect and release a driving connection between the shaft 1 and the shaft 5. Operation of the clutch C1 is effective to provide, in combination with the controls 9 and 10 for the gearing, low and intermediate speed ratios. The clutch C2 is operable, when the clutch C1 is engaged, to provide high speed ratio, and is also operable to provide reverse drive in conjunction with the gearing control 11. Fluid under pressure is supplied to the actuating mechanism 8 by a pump 12 of the gear type.

Describing the clutch assembly 3 in detail, the clutch assembly comprises an annular clutch driving plate 13 having a plurality of circumferentially spaced lugs 14 at its outer periphery, the lugs 14 having openings therein receiving bolts 15 of the bolt and nut assemblies 16. The bolts 15 also extend through sleeves 17 disposed between the plate 13 and the flywheel 2 and serving to space the plate 13 from the flywheel 2. The bolts 15 extend through the flywheel, and nuts 18 are threaded on the bolts and act to maintain the bolts 15, sleeves 17, plate 13 and the flywheel 2 in assembly. As seen in Figs. 1 and 2, the flywheel 2 comprises a semi-rigid annular plate 19 having a ring gear 20 fixed to its outer periphery by rivets 21, the inner periphery of the plate 19 being secured by bolt and nut assemblies 22 to a radially extending flange 23 of the engine-driven shaft 1. The flange of the shaft 1 is provided with a shoulder 24 serving to center the clutch assembly 3 with respect to the axis of the shaft 1.

The clutch driving plate 13 is common to and may be considered as one of the driving members of either the clutch C1 or the clutch C2. The clutch C1 further comprises a pressure plate 25 and a driven plate 26 disposed between the plates 13 and 25 and having its hub splined as at 27 to the shaft 4. The clutch C2 also comprises a pressure plate 28 and a driven plate 29 disposed between the plates 13 and 28 and having its hub splined as at 30 to the quill shaft 5. The aforesaid torque-transmitting elements of the clutches C1 and C2 of the double clutch assembly 3 are adapted to run in an oil bath and, to insure adequate frictional engagement of the driving and driven members of the respective clutches to transmit drive between the engine-driven shaft 1 and one or the other of the shafts 4 and 5, as desired, the driven clutch plate members 26 and 29 are preferably provided with cork facings for engagement with the adjacent metal faces of the plate 13 and the respective plates 25 and 28.

The pressure plates 25 and 28 are connected to the flywheel 2 for rotation therewith by means of an annular dished metal stamping or plate 31 provided with a plurality of circumferentially spaced openings at its outer periphery for receiving therein the bolts 15 to drivingly connect the flywheel 2 to the plate 31, and the plate 31 is also provided with other circumferentially spaced openings, indicated at 32, for receiving bolts 33, the bolts extending through notches in peripheral lugs on the pressure plates 25 and 28 to provide a driving connection between the plate 31 and the pressure plates. As shown in Figs. 2 and 3, each bolt 33 has surrounding the same a sleeve 34, one end of which is received within a recess 35 of the plate 25 and abuts the plate 25, the other end of the sleeve extending through the pressure plate 28 and the plate 31 and abutting a plate 36 having a function to be described hereinafter. Nuts 37 are secured to the bolts 33. Certain sleeves 34 and bolts 33 extend through peripheral lugs of the driving plate 13, as shown in Fig. 3. From this description, it will be apparent that the bolts and nuts 33 and 37 tie the pressure plates 25 and 28 and the plate 31 together so that the same will rotate in unison with the driving plate 13, the flywheel 2 and the drive shaft 1. As the pressure plate 25 is fixedly connected by the sleeves 34, bolts 33 and nuts 37 to move with the plate 36, movement of the plate 36 to the right, as viewed in Figs. 1, 2, and 3 will cause the pressure plate 25 to be moved into engagement with its associated driven plate 26 of the clutch C1, and the plate 26 will be clamped between the plates 25 and 13. The pressure plate 28 is movable axially of the clutch assembly through its axially floating connection to the sleeves 34 and bolts 33, as shown in Figs. 1, 2, and 3, so that movement of the pressure plate 28 to the left will cause the driven plate 29 of the clutch C2 to be clamped between the pressure plate 28 and the driving clutch plate 13. The clutches C1 and C2 are normally maintained in disengaged condition and, for this purpose, a plurality of springs 38 surrounding sleeves 34 and bolts 33 are disposed between the pressure plates 25 and 28 of the clutches to urge the pressure plates 25 and 28 away from each other to disengage the pressure plates from their associated driven plates. It may be noted that movement of either pressure plate toward the other pressure plate to effect engagement of the moved pressure plate into engagement with its associated friction driven plate will cause the springs to be compressed. Upon the release of clutch-applying pressure, the compressed springs will act to urge the moved pressure plate to its normal position as shown.

To selectively or successively engage the clutches C1 and C2, a fluid-operated actuating mechanism, generally indicated at 8 is employed to effect axial movement of the pressure plates 25 and 28 toward the intermediate plate 13 for engagement of these plates with the driven clutch plates 26 and 29. The pressure-fluid actuated mechanism 8 comprises an annular pressure-fluid distributing member 39 having, at its radially inner extremity, an axially extending sleeve hub 40 rotatably mounted on the quill shaft 5. The outer periphery of the distributor 39 is provided with a shoulder 41 for receiving the inner periphery of the annular plate 31 drivingly connected to the flywheel 2 and also connected to the pressure plates 25 and 28 as described, rivets 42 extending through the distributor 39 and the driving plate 31 and also through two annular L-section ring members 43 and 44 disposed at opposite sides of the distributor 39 to fixedly connect the rings 43 and 44 and the distributor 39 to the drive plate 31.

The rings 43 and 44 have axially extending flange portions 43a and 44a, respectively, the flange 43a being disposed radially outwardly of an annular rib portion 39a of the distributor 39 to define therewith and the body of the distributor 39, a cylindrical chamber 46 receiving an annular piston 47 mounted therein, the piston 47 having associated therewith annular lip-type seals identified at 48, 48 to prevent the escape of fluid from the chamber 46. As seen in Figs. 1, 2, and 3, the pressure plate 28 has a recess 49a receiving the flange 43a of the ring 43 which also acts to guide and center the pressure plate 28 during axial movement thereof. The piston 47 is provided with an axially extending flange 47a at its outer periphery received within an annular recess 49b in the inner periphery of the pressure plate 28 to provide a connection between the piston 47 and plate 28 so that, upon the entrance of pressure fluid into the chamber 46, the piston 47 will be moved to the left as shown in Figs. 1, 2, and 3 to directly act upon the pressure plate 28 to move it into engagement with its associated driven plate 29 and thereby apply the clutch C2 to effect a driving connection between the engine-driven shaft 1 and the transmission input shaft 5. It will be apparent, upon the release of pressure on the fluid in the chamber 46, the compressed springs 38 will exert force on the plate 28 tending to move the pressure plate 28 out of engagement with the driven plate 29 to effect disengagement of the clutch C2.

The pressure-fluid actuating mechanism 8 further comprises a piston 50 of annular form as shown in Figs. 1, 2 and 3, and having its outer periphery positioned against and movable along the annular flange 44a of the ring 44 and its inner periphery slidably mounted on the sleeve hub 40 of the distributor 39. A pressure-fluid chamber 51 is formed by the piston 50, the flange 44a of the ring 44 and the distributor 39 so that, upon the entrance of pressure fluid into the chamber 51, the piston 50 will be moved towards the right, as viewed in Figs. 1 and 2, to effect actuation of a dished-shaped plate 36 (which may be considered as a portion of the piston 50 inasmuch as the two move in unison), toward the right causing similar movement of the bolts 33 and, through their connection to the pressure plate 25 by the nuts 37, the pressure plate 25 will engage the driven clutch plate 26 so that the driven plate 26 will be packed under pressure between the pressure plate and the driving plate 13 to effect a driving connection between the engine-driven shaft 1 and the transmission input shaft 4. The piston 50 is provided with a step which is used as a pilot for the plate 36 in order to center the actuating plate 52. It will be apparent that, upon the release of fluid pressure in the chamber 51, the compressed springs 38 can become operative to react against the pressure plate 25 to move this plate away from the driven clutch plate 26 to release the driving connection afforded by the clutch C1 between the shafts 1 and 4.

In the event, it is desired to release a driving connection between the engine-driven shaft 1 and either or both the driven shafts 4 or 5 during the transmission of torque between the shafts and the pressure fluid from the pump and acting on either or both the pistons 47 and 50 is by-passed to relieve pressure on the latter, the fluid remaining in the pressure chambers 46 and 51 is impelled outwardly under centrifugal force to an extent whereby the pressure exerted by the springs 38 to disengage the clutch and the pressure exerted by the fluid under centrifugal force acting to engage the clutch may be placed in balance, with the result that the engaged clutch or clutches C1 or C2 will fail to disengage at the desired time. To insure the prompt disengagement of either one or the other or both of the clutches, additional means are provided to augment the force exerted by the springs 38 to release the clutch or clutches, and these means comprise a release mechanism responsive to the speed of the engine-driven shaft 1. This speed-responsive mechanism is generally indicated at 53 in Figs. 3 and 4 and comprises a plurality of levers 54, pivotally mounted on circumferentially spaced portions on the outer periphery of the pressure plate 28, each lever 54 is of U-section as seen in Fig. 4 and a pin 55 extends through the spaced arms 56 thereof and spaced portions of a radially projecting lug 57 to pivotally mount the lever on the plate 28. Each lever has its radially extending arms 56 provided with slots 58 therein for receiving one end of a strut 59 having its other end received within a suitable recess 60 in the pressure plate 25. Each lever 54 is also provided with an axially extending arm 61 having a weight 62 attached thereto and responsive under centrifugal force engendered by the rotating clutch assembly to move radially outward of the assembly to cause the lever to pivot about the pin 55 and thereby cause the arms 56 of the lever to move the strut 59 toward the left as viewed in Fig. 3 to provide a positive force for moving the pressure plates 25 and 28 away from each other. This force is effective to augment the pressure of the compressed springs 38 to obtain instantaneous disengagement of either the pressure plates 25 or 28 or both of these plates from their engagement with the driven clutch plates 26 or 29, respectively. It will be readily understood that, when one or the other or both of the pressure plates 25 and 28 are engaged with their respective clutch driven plates 26 and 29, the compressive action of the springs and the centrifugal force exerted on either one or both of the pressure plates will be effective to quickly move either one or the other pressure plates out of engagement with its associated driven clutch plate against the counter-force exerted by the centrifugally actuated fluid in either or both chambers 46 and 51. It may also be noted that the pump is capable of supplying fluid under sufficiently high pressure to the pistons to engage one or the other or both clutches and that the force exerted on the pressure plate or plates by the springs 38 and the speed-responsive mechanism 53 will be ineffective to move the pressure plate or plates to disengage either or both clutches when engaged.

A feature of the embodiment of the invention described is the utilization of the sleeve hub 40 of the distributor 39 to drive the gear-type pump 12 to supply fluid under pressure to the pressure-fluid clutch-actuating mechanism 8 to effect operation of either one or both of the clutches C1 and C2. More particularly, the hub 40 of the distributor 39 has its rear extremity provided with slots 63 meshing with teeth 64 on one of two meshing gears 65, the gears being disposed and mounted within a casing 66 secured to a stationary portion 67 of the clutch and transmission housing 68. The distributor 39 and, more particularly, its hub portion 40 is thus adapted to drive the pump during rotation of the engine-driven shaft 1 through the connection of the distributor 39 with the flywheel 2 and shaft 1 as previously described, whereby the pump is effective to supply fluid under pressure, upon the manipulation of suitable controls (not shown), to either one or both of the pressure chambers 46 or 51 of the fluid-actuating mechanism 8 to operate the pistons 47 or 50 or both to effect actuation of either one or both of the clutches C1 or C2. The pump casing is provided with a pipe 69 extending within an oil sump 70 serving to connect the oil in the sump with the pump which will force fluid under pressure into a conduit 71 which may be connected by suitable controls (not shown) to either one or both chambers 46 and 51 to actuate pistons 47 and 50 to selectively or successively engage either or both clutches C1 and C2.

To engage clutch C2, the conduit 71 is connected to an annular groove 72 in the pump casing 66 communicating with a port 73 in the distributor 40. As shown in Fig. 3, the port 73 is connected to passages 74 and 75 in the distributor 39 to direct the pressure fluid into the chamber 46 for urging the piston 47 outward and the clutch C2 into engagement.

To engage clutch C1, the pressure outlet port 71 of the pump casing 66 is connected to an annular groove 76 in the casing 66, the groove 76 being aligned with a port 77 in the distributor hub 40 to communicate fluid under pressure to the passage 78 in the distributor hub and thence through a passage 80 in the distributor 39 to the pressure chamber 51 for urging the piston 50 toward the left to effect engagement of the clutch C1.

Referring to Figs. 2 and 3, a plurality of screws 81 are threaded into and pass through openings in the distributor 39, the rings 43 and 44, and the plate 31 to engage the pressure plate 28 of the clutch C2. The screws 81 may be utilized to adjust the plate 28 for wear and, after such adjustment, are prevented from unwanted rotation by lock nuts 82.

Briefly describing the planetary gear set 6, its controls 9, 10, and 11 and their cooperative relation to the clutches C1 and C2 to obtain the various forward speed ratios and reverse drive of the transmission, the planetary gear set 6 comprises a ring gear 83 and a sun gear 84, planet gears 85 and 86 meshing with each other, and the planet gear 86 meshing with the ring gear 83 and the planet gear 85 meshing with the sun gear 84, and a sun gear 87. The planet gears 86 are elongated pinions having gear portions 86a meshing with the sun gear 87. The planet gears 85 and 86 are rotatably mounted on a planet gear carrier 88. The ring gear 83 is connected to the driven shaft 7 of the transmission; the sun gear 84 is formed as an integral end portion of the shaft 4, and the sun gear 87 is an integral end portion of the quill shaft 5. The planet gear carrier 88 is rotatably disposed with respect to the shafts 4, 5 and 7, and it will be noted that the shaft 7 at its end adjacent the sun gear 84 has a mounting portion for rotatably supporting the carrier.

The planet gear carrier can be prevented from rotating by means of the brake 11. The brake 11 comprises a drum 89 formed on the carrier and a friction band 90 surrounds the brake drum. The brake 11 is utilized to complete a reverse drive power train as will be described hereinafter in greater detail. The brake 10 comprises a brake drum 91, splined as at 92 to the quill shaft and thereby rotatable therewith, and a brake band 93 engageable with the brake drum 91 to prevent rotation of the quill shaft 5 and thereby the sun gear 87 to complete a forward drive power train as will be described hereinafter. The coupling device 9 is in the form of an overrunning clutch and comprises an inner race 94 surrounding the quill shaft 5, and it may be noted that the inner race 94 is formed as an axially extending portion of an annular support member fixed to the housing 68 and providing a central support for the shafts 4 and 5 and the various elements supported on these shafts. A plurality of sprags 95 are disposed between the inner race 94 and an outer race 96, the outer race 96 being connected to the drum 89 of the brake 11 and thereby rotatable therewith. The oneway coupling device 9 is utilized for completing a forward drive power train which will be described hereinafter in greater detail.

Describing now the operation of the transmission and including its controls for obtaining three forward speed ratio drives and reverse drive, the transmission is shown in its neutral condition in Fig. 1, the clutches C1 and C2 and the control devices 9, 10 and 11 being disengaged. Low speed forward drive through the transmission is obtained by effecting actuation of the pressure plate 25 into engagement with the clutch driven plate 26. The clutch C1 thereby functions to transmit drive from the driving shaft 1 to the shaft 4, and the sun gear 84 will rotate in a clockwise direction as viewed from the left in Fig. 1 causing the planet gears 85 and 86 and their carrier to tend to rotate in a counter-clockwise direction. However, the sprags 95 of the one-way or overrunning clutch or coupling device 9 will engage the inner and outer races 94 and 96 upon any attempted rotation of the outer race 96 in a counter-clockwise direction by the carrier connected thereto. Accordingly, counterclockwise rotation of the planet gears 85 and 86 and carrier 88 is prevented, inasmuch as the outer race 96 of the coupling device is connected to the planet carrier 88 and the inner race 94 is fixed to the stationary transmission housing. In this condition of the transmission, drive proceeds from the shaft 4 through the gears 86, 85 and 83 to the driven shaft 7.

The transmission is shifted from low speed forward drive to second or intermediate speed by merely causing engagement of the brake band 93 with the drum 91 of the brake device 10, the clutch C1 being maintained in engaged position. As it will be understood, the planet gear carrier in low speed drive is the reaction member of the gear set, and engagement of the brake device 10 to hold the sun gear 87 stationary for second speed drive causes the gear 87 to become the reaction member instead of the carirer. Upon the application of the brake device 10, drive will proceed from the drive shaft 1 through the clutch C1 to the shaft 4, the gears 85, 86, and 83 to the driven shaft 7 in the same manner as in low speed drive, but due to the fact that the sun gear 87 is now stationary, the driven shaft 7 is rotated at a faster speed than in the low speed drive to provide the second or intermediate speed ratio. It may be noted that the one-way coupling device 9 will be disengaged during the establishment of second speed drive, as the carrier and gears 85 and 86 will rotate in a clockwise direction.

High speed forward or direct drive is obtained by disengaging the brake device 10 and by engaging the clutch C2. Engagement of the clutches C1 and C2 lock the carrier 88 and the sun gear 87 together so that all of the parts of the gear set rotate as a unit, and the driven shaft 7 will rotate at a one-to-one drive with respect to the driving shaft 1. In direct drive, the one-way coupling device is also rendered ineffective, as the carrier and gears 85 and 86 will rotate in a clockwise direction.

Reverse drive is obtained by engaging the clutch C2 to provide a drive between the driving shaft 1 and the quill shaft 5 and thereby the sun gear 87, and by engaging the brake device 11 to prevent rotation of the carrier 88 which then becomes the reaction member of the gear set whereby the sun gear 87 will be rotated in a clockwise direction to cause the ring gear 83 and the driven shaft 7 to be driven in a counter-clockwise direction and reversely to the direction of rotation of the drive shaft 1.

Referring again to the double clutch assembly 3 and, more particularly, to Fig. 2, the pump casing 66 is provided with a thin plate 97 having an orifice 98 therein connected to the pressure fluid in the chamber 71 of the casing 66 so that fluid under pressure will be directed through the orifice 98 in the plate 97 and will enter a passage 99 extending through the hub 40 of the distributor 39 and its outlet end adjacent the hub 30 of the driven plate 29, the fluid under pressure then being directed downwardly, as indicated by the arrows, or radially outwardly. The driven clutch plate 29 is provided with baffle flange rings 100 and 101, the flange ring 101 serving to deflect a portion of the oil through openings 102 in the driven plate 29 and the baffle 100 acting to guide the fluid toward and between the driving plate 13 and the pressure plate 25 of the clutch C1, whereby the oil is adapted to flow freely about the cork facings of the plate 29 and through suitable radially extending or circumferentially extending grooves in the cork facings of the driven clutch plate 29 of the clutch C1. A portion of the fluid also flows from the conduit 99 between the radially extending flange of the baffle ring 101 and piston 47 and between the pressure plate 28 of the clutch C2 and driving plate 13 onto the cork facings of the driven plate 29 and thence the oil will flow through suitable radially extending or circumferentially extending grooves in the cork facings of the driven plate 29. The aforesaid baffle arrangement is valuable in that oil will be deflected by the baffle rings 100 and 101 toward and into engagement with the cork facings of the driven disc 26 and the engageable or engaged faces of the driving plate 13 and pressure plate 25 to effect cooling of the same, the major portion of the oil flowing from the conduit 71 thus being directed to the clutch C1 inasmuch as the clutch C1 is the starting clutch in low speed forward ratio and reverse drive of the transmission and, therefore, the cooling oil will be effective in preventing deleterious effects on the cork facings during rotation of the plates 25 and 13 relative to the driven plate 26 during initial engagement and when the plates 25 and 13 and 26 are engaged. The transmission of cooling oil to the driven plate 29 of the clutch C2 is also desirable to avoid damage to the cork facings during initial engagement of the same with the pressure plate 28 and drive plate 13 of the clutch C2. This cooling effect on the driven plate 26 of the clutch C1 is especially desirable when the clutch C1 is engaged, the car is standing still and the engine is pulling, in other words, at stall speed.

It may be noted from a consideration of Figs. 1, 2 and 3 that the piston 47 operating the pressure plate 28 of the clutch C2 is much smaller than the piston 50 operating the pressure plate 25 of the clutch C1. The piston 50 has about substantially twice the area of the piston 47, as a greater pressure fluid area is desired inasmuch as the clutch C1 is required during the various first and second speed ratios, as previously described, to take the full engine torque, whereas the clutch C2 is not required to sustain full engine torque, as the engine torque carried by the clutch C1 is divided between the clutches C1 and C2 so that the clutch C2 is only required to take half engine torque, with the consequence that the piston 47 can have a reduced area in comparison to the area of the piston 50 to effectively move the pressure plate 28 into engagement with the driven clutch plate of the clutch C2 and to maintain such engagement, during the establishment of third speed ratio.

Figure 5:
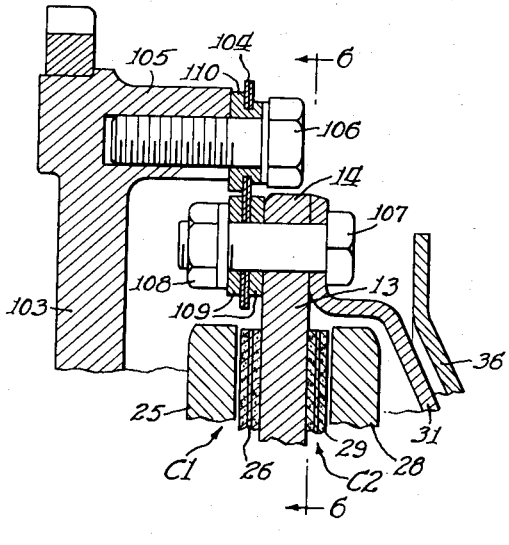
Fig. 5 is a sectional view of a fragmentary portion of the clutch assembly illustrating another manner of drivingly connecting the same with a conventional engine-driven flywheel, said section being taken on line 5—5 of Fig. 6.

Referring to the modification in Figs. 5 and 6, the clutch assembly may, if desired, be connected to a conventional flywheel, indicated at 103, through the medium of sets of flexible metal straps 104 circumferentially spaced about the clutch assembly, one end of each strap of a set being connected to an axially extending flange 105 of the flywheel 103 by means of bolts 106 passing through openings in the flexible straps and being threaded into the flange 105 of the flywheel as shown in Fig. 5. The other end of the straps of the set extend toward the driving plate 13 and has openings receiving a bolt 107 extending through the opening in the adjacent lug 14 of the driving plate 13 and an opening in the plate 31, a nut 108 being secured to the bolt 107 whereby the straps and the plates 13 and 31 are fixedly connected to each other. Suitable spacers 109 and 110 are utilized to position the straps with respect to the flywheel and clutch members. The flexible straps 104 thus provide a means for maintaining the clutch assembly in axial alignment with the axis of the engine-driven shaft while permitting a certain amount of small axial movement between the flywheel and the clutch assembly.

Referring to Fig. 7, there is illustrated a modification of the clutch assembly shown in Figs. 1 to 6 and, more particularly, the fluid-actuating mechanism, indicated at 200 differs from that previously described in the following particulars. The fluid distributor plate 201 has its hub portion 202 rotatably mounted on the fixed sleeve portion 203 connected to the clutch housing 204 by bolts 205, and the sleeve portion 203 engages a sleeve bearing 206 mounted on the quill shaft 5. The hub portion 202 has an axially extending rear extremity formed with gear teeth 207 meshing with a gear 208 of a pump 209, the gears of the pump being rotatably mounted in a portion of the clutch housing. Upon rotation of the plate 31 drivingly connected to the engine-driven shaft and to the distributor 201, the gear teeth 207 on the hub 202 of the distributor will be effective to drive the gears of the pump to provide fluid under pressure directed by suitable controls (not shown) to the pistons 210 and 211 to operate the respective associated clutches C1 and C2. It may be noted that the pump is operative to force fluid under pressure into a chamber 212 and the fluid may be directed by suitable controls to a chamber 213 provided by the sleeve 203 and the sleeve bearing 206 and thence through a passage 214 in the sleeve 203 into the chamber 215 for operating the piston 211, or the controls can permit the flow of fluid under pressure from the chamber 212 through a conduit (not shown) to an annular groove 216 in the stationary sleeve portion 203 and thence through a passage 217 in the hub 202 of the distributor into a chamber 218 for actuating the piston 210 to effect engagement of the clutch C1.

It is to be understood that the invention is not to be limited to the specific structures, arrangements, and devices hereinabove-described, except only insofar as the claims may be so limited, as it will be apparent to those skilled in the art that changes may be made without departing from the principle of the invention.

I claim:

1. In a friction clutch assembly, three rotatable axially aligned driving members and two driven members between respective driving members, two of said driving members being axially movable to engage said driven members therewith and the other driving member, pressure-fluid operated means for shifting said axially movable members for engaging said driving and driven members, and means for disengaging said members and including a mechanism connected to and responsive to the speed of one of said axially movable driving members and including levers pivotally mounted thereon, struts connecting said levers with the other of said axially movable driving members, and centrifugal weights on said levers operative upon rotation of said driving members to actuate said levers and said struts to disengage said driving and driven members.

2. In a double clutch assembly comprising a driving plate, pressure plates on opposite sides of said driving plate and axially movable relative thereto, driven plates between said driving plate and respective pressure plates, pressure-fluid operated means for selectively operating one or the other of said pressure plates to engage the moved pressure plate with the adjacent driven plate, spring means disposed between said pressure plates and acting to move said pressure plates out of engagement with said driven plates, and mechanical means responsive to the speed of rotation of said driving plate and connected to said pressure plates and acting to move said pressure plates out of engagement with said driven plates.

3. In a double clutch assembly comprising a driving plate, pressure plates on opposite sides of said driving plate and axially movable relative thereto, driven plates between said driving plate and respective pressure plates, pressure-fluid operated means for selectively operating one or the other of said pressure plates to engage the moved pressure plate with the adjacent driven plate, and means responsive to the speed of rotation of said driving plate and acting to move said pressure plates out of engagement with said driven plates, said speed-responsive means comprising a plurality of levers pivotally mounted on one of said pressure plates, struts connecting said levers with the other of said pressure plates, and weights connected to said levers and operative under centrifugal force to move said pressure plates away from each other and out of engagement with said driven plates.

4. In a friction clutch assembly comprising a driving plate, a pressure plate, and a driven plate between said plates, means for drivingly connecting said driving plate to said pressure plate and comprising an annular plate having at its outer periphery circumferentially spaced portions secured to said driving plate, connecting members extending through other circumferentially spaced portions of said annular plate at the outer periphery thereof and also through openings in the outer periphery of said pressure plate, means supporting said connecting members, and a plurality of members movably mounted in the inner periphery of said annular plate and engaging said pressure plate for axially shifting the pressure plate to adjust the pressure plate for wear.

5. In a friction clutch assembly, a driving plate, a plurality of pressure plates disposed at opposite sides of said driving plate, driven plates between said driving plate and respective pressure plates, a pressure-fluid pump, means disposed between said pump and said plates and connecting said driving plate to said pump for operating the same to deliver fluid under pressure through a passage in the connecting means to one of said driven plates adjacent said passage, said last-mentioned plate having circumferentially spaced openings therein disposed inwardly of the friction facings thereof, and baffle rings associated with said last-mentioned plate for directing fluid through said openings into engagement with the friction facings of the other driven plate to effect cooling of the same.

References Cited in the file of this patent

UNITED STATES PATENTS

| | | |
|---|---|---|
| 1,039,968 | Leech | Oct. 1, 1912 |
| 1,524,770 | Wood | Feb. 3, 1925 |
| 1,923,438 | Hughes | Aug. 22, 1933 |
| 1,938,914 | Kress | Dec. 12, 1933 |
| 2,003,212 | Millican et al. | May 28, 1935 |
| 2,088,782 | Ford et al. | Aug. 3, 1937 |
| 2,150,950 | Thoma | Mar. 21, 1939 |
| 2,158,440 | Spase | May 16, 1939 |
| 2,169,639 | Grote | Aug. 15, 1939 |
| 2,231,411 | Lawrence | Feb. 11, 1941 |
| 2,328,090 | Nutt et al. | Aug. 31, 1943 |
| 2,328,091 | Nutt et al. | Aug. 31, 1943 |
| 2,328,092 | Nutt et al. | Aug. 31, 1943 |
| 2,352,478 | Halford | June 27, 1944 |
| 2,376,545 | Livermore | May 22, 1945 |
| 2,399,853 | Chilton | May 7, 1946 |
| 2,437,430 | Lawrence | Mar. 9, 1948 |
| 2,441,543 | Langfield | May 11, 1948 |
| 2,452,775 | Lindsley | Nov. 2, 1948 |
| 2,498,123 | Hobbs | Feb. 21, 1950 |
| 2,535,924 | Hobbs | Dec. 26, 1950 |
| 2,540,639 | Winther et al. | Feb. 6, 1951 |
| 2,568,135 | Vincent | Sept. 18, 1951 |
| 2,586,220 | Gerst | Feb. 19, 1952 |
| 2,604,197 | Livermore | July 22, 1952 |

FOREIGN PATENTS

| | | |
|---|---|---|
| 890,292 | France | Nov. 2, 1943 |